United States Patent
Ashihara

(10) Patent No.: US 10,456,863 B2
(45) Date of Patent: Oct. 29, 2019

(54) SUCTION METHOD, SUCTION DEVICE, LASER PROCESSING METHOD, AND LASER PROCESSING DEVICE

(71) Applicant: FUKUI PREFECTURAL GOVERNMENT, Fukui-shi, Fukui (JP)

(72) Inventor: Masaaki Ashihara, Fukui (JP)

(73) Assignee: FUKUI PREFECTURAL GOVERNMENT, Fukui-shi (JP)

(*) Notice: Subject to any disclaimer, the term of this patent is extended or adjusted under 35 U.S.C. 154(b) by 516 days.

(21) Appl. No.: 15/127,549

(22) PCT Filed: Mar. 23, 2015

(86) PCT No.: PCT/JP2015/058685
§ 371 (c)(1),
(2) Date: Sep. 20, 2016

(87) PCT Pub. No.: WO2015/146887
PCT Pub. Date: Jan. 10, 2015

(65) Prior Publication Data
US 2017/0136576 A1    May 18, 2017

(30) Foreign Application Priority Data
Mar. 27, 2014 (JP) .................. 2014-066118

(51) Int. Cl.
*B23K 26/00* (2014.01)
*B23K 26/142* (2014.01)
(Continued)

(52) U.S. Cl.
CPC .............. *B23K 26/142* (2015.10); *B08B 5/02* (2013.01); *B08B 5/04* (2013.01); *B08B 15/04* (2013.01);
(Continued)

(58) Field of Classification Search
CPC ............ B23K 26/142; B08B 5/02; B08B 5/04
(Continued)

(56) References Cited

U.S. PATENT DOCUMENTS 2,226,630 A * 12/1940 McCord ................ A47L 5/14
  15/346
2,232,218 A *  2/1941 Doty ................... A46B 9/06
  132/112
(Continued)

FOREIGN PATENT DOCUMENTS

EP    1 072 800 A2   1/2001
GB    2 428 398 A    1/2007
(Continued)

OTHER PUBLICATIONS

International Search Report for PCT/JP2015/058685 dated Jun. 23, 2015.

*Primary Examiner* — Viet Le
(74) *Attorney, Agent, or Firm* — Sughrue Mion, PLLC

(57) ABSTRACT

An object is to provide a suction method and a suction device which depressurize the pressure of the surface of a target installed in an open system to a critical pressure or less and which thereby can suck it and a laser processing device and a laser processing method using these. In a state where a predetermined operating distance is apart from a target installed in an open system and a suction port, the pressure of an inside of a pressure reduction chamber communicating with the suction port is set equal to or less than a critical pressure at which the speed of a gas sucked from the suction port is brought into a critical state; the jet speed of the gas in a jetting port from which the gas is jetted toward the target is set more than a Mach number of 0.2, the Mach number being obtained by dividing a jet speed of the gas by the sound speed of the gas jetted from the jetting port, the gas is jetted from the jetting port and is sucked by the suction port; a swirl flow is formed so as to surround the suction port between the surface of the target and the suction port; and thus the pressure of a central region of the swirl flow from the suction port to the surface of the target is reduced to the critical pressure or less and suction is performed.

8 Claims, 7 Drawing Sheets

(51) Int. Cl.
  *B23K 26/16* (2006.01)
  *B08B 5/02* (2006.01)
  *B08B 15/04* (2006.01)
  *B23K 26/14* (2014.01)
  *B23K 26/38* (2014.01)
  *B23K 26/40* (2014.01)
  *B08B 5/04* (2006.01)
  *B23K 103/04* (2006.01)

(52) U.S. Cl.
  CPC ......... *B23K 26/1476* (2013.01); *B23K 26/16* (2013.01); *B23K 26/38* (2013.01); *B23K 26/40* (2013.01); *B08B 2215/003* (2013.01); *B23K 2103/05* (2018.08)

(58) Field of Classification Search
  USPC .............................. 219/121.84, 61.12, 78.14
  See application file for complete search history.

(56) References Cited

U.S. PATENT DOCUMENTS

| | | | | |
|---|---|---|---|---|
| 2,238,541 A * | 4/1941 | Spagnolo | ............ | A61H 9/0021 15/246.3 |
| 2,864,119 A * | 12/1958 | Crise | ............ | A47L 9/02 134/37 |
| 2,916,761 A * | 12/1959 | Oberg | ............ | E01H 1/0863 15/322 |
| 3,161,900 A * | 12/1964 | Hornschuch | ............ | E21F 5/20 15/345 |
| 3,915,739 A * | 10/1975 | Maahs | ............ | B08B 5/02 134/21 |
| 4,078,165 A * | 3/1978 | Tuttle | ............ | B23K 26/04 219/121.67 |
| 4,149,062 A * | 4/1979 | Limmer | ............ | B23K 26/1423 219/121.68 |
| 4,303,824 A * | 12/1981 | Morgan | ............ | B23K 26/1488 219/121.82 |
| 4,500,770 A * | 2/1985 | Vock | ............ | A24C 5/606 219/121.7 |
| 4,720,621 A * | 1/1988 | Langen | ............ | B08B 7/0042 219/121.6 |
| 4,801,352 A * | 1/1989 | Piwczyk | ............ | C23C 16/042 118/50.1 |
| 5,224,235 A * | 7/1993 | Lison | ............ | A47L 7/00 15/302 |
| 5,531,861 A * | 7/1996 | Yu | ............ | B24B 37/013 134/1 |
| 6,249,932 B1* | 6/2001 | Chu | ............ | A47L 9/08 15/345 |
| 6,395,097 B1* | 5/2002 | Maheshwari | ............ | C03C 23/0075 134/182 |
| 6,474,355 B1* | 11/2002 | Jirawat | ............ | B08B 5/02 15/1.51 |
| 6,683,277 B1* | 1/2004 | Millard | ............ | B23K 26/123 219/121.84 |
| 7,601,933 B2* | 10/2009 | Yoshihara | ............ | F27D 19/00 118/724 |
| 7,863,542 B2* | 1/2011 | Murase | ............ | B23K 26/1462 219/121.68 |
| 8,013,270 B2* | 9/2011 | Shimoda | ............ | C23C 16/45517 219/121.6 |
| 8,062,409 B2* | 11/2011 | Kaske | ............ | B08B 5/00 134/166 R |
| 8,283,596 B2* | 10/2012 | Murase | ............ | B23K 26/0732 219/121.84 |
| 8,492,677 B2* | 7/2013 | Caristan | ............ | B23K 26/0838 219/121.72 |
| 9,061,304 B2* | 6/2015 | Miller | ............ | B23K 26/1476 |
| 2002/0096195 A1* | 7/2002 | Harvey | ............ | B08B 5/02 134/21 |
| 2002/0179582 A1* | 12/2002 | Reichmann | ............ | B23K 26/0665 219/121.84 |
| 2003/0164396 A1* | 9/2003 | Suga | ............ | B23K 1/206 228/219 |
| 2004/0226927 A1* | 11/2004 | Morikazu | ............ | B23K 26/123 219/121.84 |
| 2005/0061780 A1* | 3/2005 | Wakabayashi | ............ | C23C 16/047 219/121.6 |
| 2005/0184030 A1* | 8/2005 | Bermann | ............ | B23H 7/20 219/69.11 |
| 2007/0145026 A1* | 6/2007 | Murase | ............ | B23K 26/16 219/121.84 |
| 2007/0151958 A1* | 7/2007 | Modra | ............ | B23K 26/16 219/121.67 |
| 2007/0199930 A1* | 8/2007 | McElroy | ............ | B23K 26/032 219/121.86 |
| 2008/0041832 A1* | 2/2008 | Sykes | ............ | B23K 26/12 219/121.84 |
| 2008/0302770 A1* | 12/2008 | Traverso | ............ | B08B 7/0042 219/121.68 |
| 2012/0204909 A1* | 8/2012 | Arjomand | ............ | A47L 25/00 134/37 |
| 2013/0074281 A1* | 3/2013 | Takahashi | ............ | A47L 9/00 15/339 |
| 2013/0229015 A1* | 9/2013 | Tepic | ............ | F03D 1/04 290/54 |
| 2014/0007372 A1* | 1/2014 | Cheng | ............ | B08B 5/02 15/345 |
| 2014/0048519 A1* | 2/2014 | Gadd | ............ | B23K 26/16 219/121.68 |
| 2015/0000705 A1* | 1/2015 | Dehn | ............ | B08B 3/028 134/21 |
| 2015/0239020 A1* | 8/2015 | Ponomarev | ............ | B08B 3/12 134/1 |
| 2017/0136576 A1* | 5/2017 | Ashihara | ............ | B23K 26/1476 |

FOREIGN PATENT DOCUMENTS

| | | |
|---|---|---|
| GB | 2 433 459 A | 6/2007 |
| JP | 8-61735 A | 3/1996 |
| JP | 10-99978 A | 4/1998 |
| JP | 2001-96233 A | 4/2001 |
| JP | 2001-254983 A | 9/2001 |
| JP | 2007-7724 A | 1/2007 |
| WO | 2005/118210 A1 | 12/2005 |

* cited by examiner

SUCTION METHOD, SUCTION DEVICE, LASER PROCESSING METHOD, AND LASER PROCESSING DEVICE

CROSS REFERENCE TO RELATED APPLICATIONS

This application is a National Stage of International Application No. PCT/JP2015/058685 filed Mar. 23, 2015, claiming priority based on Japanese Patent Application No. 2014-066118 filed Mar. 27, 2014, the contents of all of which are incorporated herein by reference in their entirety.

TECHNICAL FIELD

The present invention relates to a suction method and a suction device which are opened to the atmospheric pressure, and also relates to a laser processing method and a laser processing device which use the suction method or the suction device to remove or recover a by-product generated at the time of laser processing.

BACKGROUND ART

It is known that when, in a system in which the suction port of a suction device is open to the atmosphere, a gas is isotropically sucked from the suction port by depressurization of the interior of the system of the suction device through the use of a pressure reduction device, in a case where the pressure within the system of the suction device becomes lower than a certain pressure beyond a predetermined pressure, the speed of the gas passing through the suction port reaches a critical state, and thus the pressure at the suction port does not become lower than the certain pressure. The pressure of the suction port in the critical state is referred to as a critical pressure. Unless otherwise particularly specified, the pressure of the suction port is assumed to indicate a pressure in the center of the suction port. A critical pressure in an isentropic flow is determined by the specific heat ratio of a gas and the pressure of the atmosphere, and when atmospheric pressure is assumed to be 1013 hPa, the critical pressure in the atmosphere is 535 hPa.

In a conventional suction device in which suction is performed by bringing a suction target close to a suction port, since the pressure of the suction port is prevented from being equal to or less than a critical pressure, a suction force is limited. Furthermore, as another structural problem, when a gas is sucked from the suction port, a stagnation point where the flow speed is zero is generated on the surface of the suction target which is a suction point, and the pressure is increased to neat the atmospheric pressure at the stagnation point, with the result that the suction force becomes insufficient. Therefore, in a method of sucking the target surface of a target by sucking a gas from a suction port, which is a general suction method, it is impossible to obtain a high pressure reduction effect, and thus a suction force is limited.

On the other hand, the suction device which utilizes the suction method described above are industrially and widely used. Examples thereof include the suction of dust and dirt such as in a vacuum cleaner, the suction of fine particles and foreign substances adhering in the assembly processes of an electronic component and an electrical component, the suction of foreign substances in the manufacturing process of food and drink containers such as a PET bottle and the suction of chips and dust generated at the time of mechanical processing such as cutting or grinding. However, in the suction device, the suction force is limited due to the critical pressure and the stagnation point described above.

Therefore, in order to more enhance the suction effect, suction devices which use a vortex airflow are proposed in Patent Literatures 1 and 2. A vortex airflow is formed on the surface of a suction target, and thus it is possible to remove the stagnation point, which is one of the problems. A vortex airflow is formed by the rotation of an impeller wing in Patent Literature 1 and by jetting a gas to the inner circumferential surface of a suction nozzle in Patent Literature 2, and a pressure reduction effect in the center of the vertex is utilized, with the result that the suction effect is enhanced. However, although, in Patent Literature 1, it is necessary to accelerate the rotation of the impeller wing to the sound speed in order that the pressure of the suction port may become equal to or less than the critical pressure, it is structurally difficult to realize the acceleration. When as in Patent Literature 2, a vortex airflow is formed only by jetting of a gas, it is difficult to form such a high-speed swirl flow in which the pressure of the suction port is made equal to or less than the critical pressure.

Even in the field of laser processing, in drilling and cutting processing, along with irradiation with laser light, the generation of molten metal particles such as sputters, metal vapors referred to as fumes and fine metal particles referred to as debris is a problem in the case of a metal material, whereas in the case of a resin material, the generation of soot, smoke and a combustion gas is a problem in the case of a resin material. In laser decontamination, it is necessary to recover radioactive wastes scattered by the irradiation with laser. Note that, hereinafter, a scattered product generated from a laser irradiation portion by the irradiation with laser is referred to as a by-product. The by-product is a factor in lowering processing quality, and there is proposed a method of removing the by-product by using a suction device as described below.

Patent Literature 3 proposes a device in which a blow nozzle and a suction duct are disposed in the vicinity of a laser processing region, jetting and suction of a fluid are simultaneously performed and thus a by-product is prevented from adhering to a processing target.

Furthermore, Patent Literature 4 proposes a device in which a laser light irradiation surface is brought into a reduced-pressure atmosphere by provision of a local exhaust function, and reduction of processing energy and removal and recovery of the by-product are performed by irradiation with laser light.

However, the devices according to the two inventions described above are designed assuming that a flat plate such as a liquid crystal panel or a flat panel display is a processing target, and when being applied to a shaped product having large surface irregularities, in the device of Patent Literature 3, it is difficult to remove a by-product because a flow is blocked by the surface irregularities, whereas in the device of Patent Literature 4, it is necessary to keep short a distance between the bottom portion of a laser processing machine and the irradiation surface of the processing target, when step differences in the processing surface are large, the effect of sucking the by-product is lowered, and thus it is not possible to prevent the by-product from adhering again to a processing cross section.

Patent Literatures 5 and 6 propose a device which removes a by-product generated by laser processing by the action of a swirl flow (a spiral flow site and a vortex airflow). As the method of generating the swirl flow in the inventions, there is used a method of disposing a groove as a guide so as to form the swirl flow, and in this method, a force in a swirl direction is applied to the flow site by the effect of viscosity caused by a boundary layer in the vicinity of a groove wall surface to thereby form the swirl flow.

In order to more enhance the pressure reduction and suction effects produced by the swirl flow, it is necessary to increase the swirl speed of the swirl flow, but when the speed of the flow is increased, the thickness of the boundary layer in the vicinity of the wall surface is reduced and thus the effect of the viscosity is lowered and the flow site under the domination of inertia is formed, with the result that it becomes difficult to form the swirl flow. Accordingly, the pressure reduction and suction effects of the swirl flow formed by the device of Patent Literatures 5 and 6 are limited.

CITATION LIST

Patent Literature

PTL 1: Japanese Unexamined Patent Application Publication (Translation of PCT Application) No. 2003-514177
PTL 2: Japanese Patent Laid-Open No. 2001-96233
PTL 3: Japanese Patent Laid-Open No. 10-99978
PTL 4: Japanese Patent Laid-Open No. 2008-114252
PTL 5: Japanese Patent Laid-Open No. 2004-337947
PTL 6: Japanese Patent Laid-Open No. 2007-7724

SUMMARY OF INVENTION

Technical Problem

The present invention has been made in order to solve the problems described above, and an object thereof is to provide a suction method and a suction device which depressurize a predetermined range of the surface of a target installed in an open system to a critical pressure or less, and which thereby can suck and recover a scattered product generated on the surface, and is to provide a laser processing device and a laser processing method using the suction method and the suction device described above.

Solution to Problem

The present invention is a suction method of depressurizing a predetermined range of a surface of a target by depressurizing a pressure reduction chamber communicating with a suction port arranged a predetermined operating distance apart from the target installed in an open system, and sucking a gas from the suction port, wherein: a pressure of an inside of the pressure reduction chamber is set equal to or less than a critical pressure at which a speed of the gas sucked from the suction port is brought into a critical state; a jet speed of the gas in a jetting port from which the gas is jetted toward the target is set more than a Mach number of 0.2, the Mach number being obtained by dividing a jet speed of the gas by a sound speed when the gas jetted from the jetting port is in a steady and stationary state; the gas is jetted from the jetting port and is sucked by the suction port; a swirl flow is formed so as to surround the suction port between the surface of the target and the suction port; and thus a pressure of a central region of the swirl flow from the suction port to the surface of the target is reduced to the critical pressure or less and suction is performed. Furthermore, the operating distance $W_d$ is set so as to satisfy Formula below, by using an equivalent circular diameter D that is a diameter providing an equivalent area in a case where a shape of the suction port is approximated as a circle and an area $A_{in}$ of a surface formed by the jetting port:

$$W_d \leq \frac{4A_{in}}{\pi D}.$$

Moreover, the jetting port is arranged with respect to the suction port so as to satisfy two Formulas below, by using the equivalent circular diameter D which is the diameter where the area is equivalent in a case where the shape of the suction port is approximated as a circle, a distance r between centers of the suction port and the jetting port and an angle $\theta_h$ formed by a straight line connecting the center of the jetting port and the center of the suction port and a velocity vector of the gas jetted from the jetting port, when the suction port and the jetting port are projected on a reference plane that is a tangent plane at a center of the plane formed by the suction port:

$$\frac{r\theta_h}{\pi D} < 1 \ \left(0 < \theta_h < \frac{\pi}{2}\right)$$

and $$r\sin\theta_h > \frac{D}{2} \ \left(0 < \theta_h < \frac{\pi}{2}\right).$$

In addition, in a laser processing method of processing a target by irradiation with laser light, a by-product produced by the irradiation with the laser light is removed or recovered by sucking a laser processing region by using the suction method.

Furthermore, a suction device includes: suction means which depressurizes a pressure reduction chamber communicating with a suction port arranged a predetermined operating distance apart from a target installed in an open system to thereby suck a gas through the suction port to an interior of the pressure reduction chamber; and jet means which includes flow rate adjustment means for adjusting a flow rate of the gas and which jets the gas from a jetting port toward the target at a high speed, wherein: a pressure of the inside of the pressure reduction chamber is set equal to or less than a critical pressure at which a speed of the gas sucked from the suction port by using the suction means is brought into a critical state; a speed of the gas jetted from the jetting port by using the jet means is set more than a Mach number of 0.2, the Mach number being obtained by dividing the speed of the gas by a sound speed when the gas is in a steady and stationary state; a swirl flow is formed so as to surround the suction port between the surface of the target and the suction port; and thus a pressure of a central region of the swirl flow from the suction port to the surface of the target is reduced to the critical pressure or less and suction is performed. Furthermore, the suction device includes operating distance adjustment means configured to which adjusts the operating distance. Moreover, the operating distance $W_d$ is set so as to satisfy Formula below, by using an equivalent circular diameter D that is a diameter providing an equivalent area in a case where a shape of the suction port is approximated as a circle and an area $A_{in}$ of a surface formed by the jetting port:

$$W_d \leq \frac{4A_{in}}{\pi D}.$$

Additionally, the suction means includes: an attainable pressure that is equal to or less than the critical pressure at which the speed of the gas sucked from the suction port is brought into the critical state; and an exhaust mechanism in which an exhaust flow rate $q_{m0}$ satisfies Formula below, by using a specific heat ratio k, a density $\rho_0$, a sound speed a and an area $A_{out}$ of a plane formed by the suction port which are physical property values of the gas in the steady and stationary state:

$$q_{m0} \geq \left(\frac{2}{k+1}\right)^{(k+1)/2(k-1)} \rho_0 a A_{out}.$$

Furthermore, in the jet means, the jetting port is arranged with respect to the suction port so as to satisfy two Formulas below, by using the equivalent circular diameter D that is the diameter providing an equivalent area in a case where the shape of the suction port is approximated as a circle, a distance r between centers of the suction port and the jetting port, and an angle $\theta_h$ formed by a straight line connecting the center of the jetting port and the center of the suction port and a velocity vector of the gas jetted from the jetting port, when the suction port and the jetting port are projected on a reference plane that is a tangent plane at a center of the plane formed by the suction port:

$$\frac{r\theta_h}{\pi D} < 1 \quad \left(0 < \theta_h < \frac{\pi}{2}\right)$$

and $$r\sin\theta_h > \frac{D}{2} \quad \left(0 < \theta_h < \frac{\pi}{2}\right).$$

Moreover, a laser processing device that processes a target by irradiation with laser light includes: the suction device according to the present invention, a by-product produced by the irradiation with the laser light is removed or recovered by sucking a laser processing region by using the suction device.

Advantageous Effects of Invention

In the present invention, it is possible to depressurize, with a simple method and device, a target position to the critical pressure or less and to perform suction, without moving the target into the chamber, even when the target is in the atmosphere by provision of the configuration described above. Furthermore, with the present invention, it is possible to suck and recover solid and liquid suction products and to obtain a high recovery rate. Moreover, since the pressure reduction effect is higher than a conventional suction device, it is possible to increase the suction speed of the suction product in comparison with the conventional suction device.

In laser processing, it is possible to remove or recover a by-product by pressurization of a laser irradiation portion, with the result that it is possible to obtain a high-quality processing surface without the re-adherence of the by-product. Moreover, the interruption of laser light by a by-product such as plasma or fume is suppressed by quick removal of a by-product from a laser irradiation region, with the result that it is possible to prevent the efficiency of the processing from being lowered.

Furthermore, even when, in laser processing, a processing target is in the atmosphere, a high-speed swirl flow is formed by jetting an inert gas such as compressed air, nitrogen or argon, and thus it is possible to reduce an oxygen partial pressure in the laser irradiation portion (by lowering an apparent oxygen concentration), with the result that it is possible to suppress the occurrence of combustion by laser irradiation.

DESCRIPTION OF EMBODIMENTS

Hereinafter, an embodiment of the present invention will be explained. Since the device configuration described below is a specific example of the present invention, various limitations are technically provided, but the present invention is not limited to these forms unless otherwise particularly specified in the following description. Furthermore, a person skilled in the art can conceive various modifications of the present invention on the device configuration described below, and they are all included in the technical range of the present invention.

Figure 1:
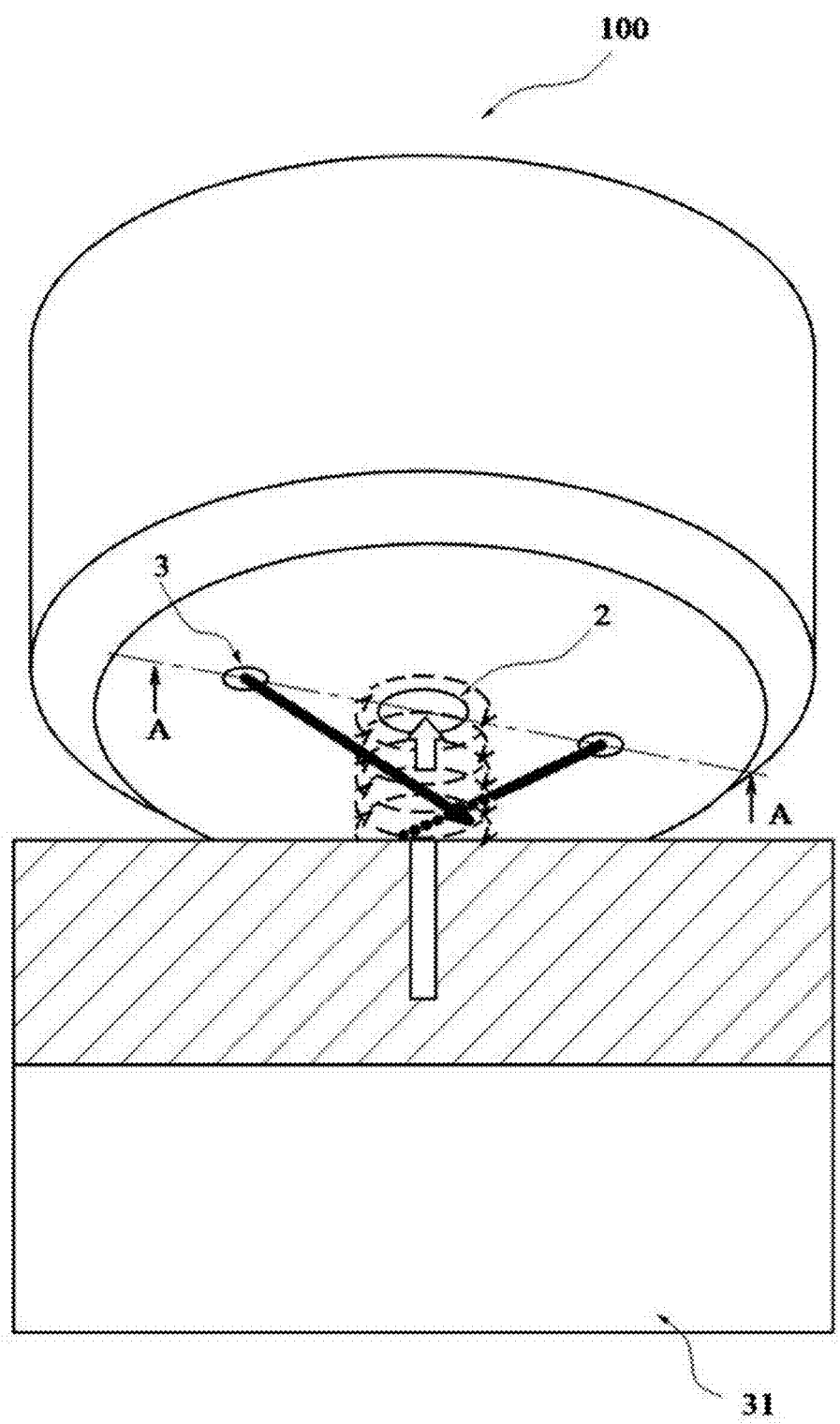
FIG. 1 is a perspective view on a device example of implementing a suction device according to the present invention.
Figure 2:
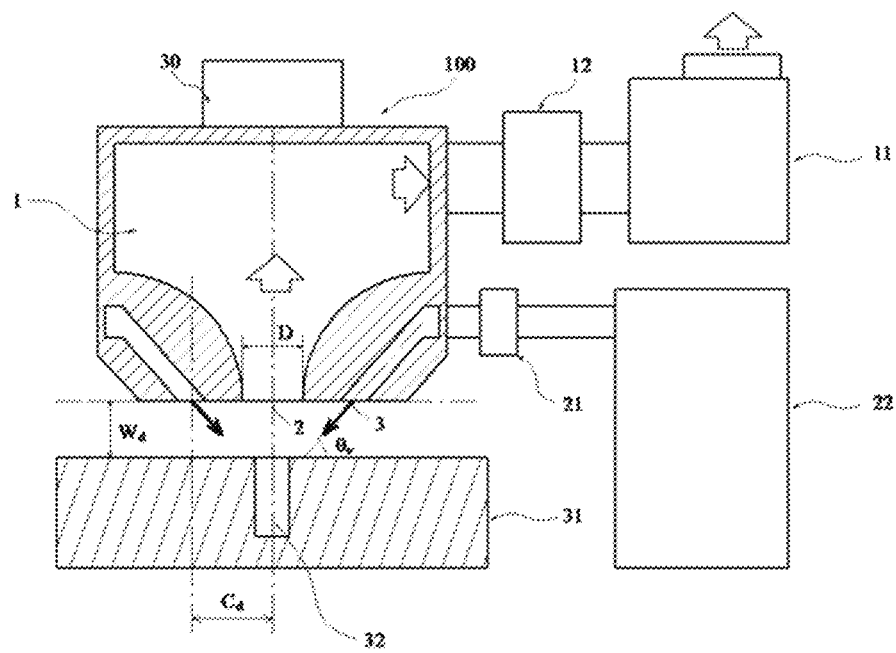
FIG. 2 is a vertical cross-sectional configuration diagram taken along line A-A of FIG. 1.

FIG. 1 is a perspective view on the embodiment of a suction device according to the present invention, and FIG. 2 is a vertical cross-sectional configuration view taken along line A-A of FIG. 1. The suction device 100 includes suction means 10 which sucks a gas through a suction port 2 into the suction device 100; jet means 20 which jets the gas from a jetting port 3 at a high speed; and operating distance adjustment means 30 which adjusts an operation distance $W_d$ between the suction port 2 and a target 31 to be sucked. The target 31 is installed in an open system. In the example, the open system is set at the atmospheric pressure. Note that, in an open system which is set at a pressure different from the atmospheric pressure, the present invention can also be used.

Moreover, although in the example, a hole portion 32 which is bored in the surface of the target 31 is formed in order to clarify a point to be sucked, the formation of the hole portion does not limit the present invention. Furthermore, although the suction port and the jetting port are integrally formed in FIG. 1, a structure in which the jetting port and the suction port are separately formed so as to easily adjust an installation position and a jetting angle can also be adopted. FIG. 1 shows an embodiment and does not limit the present invention.

The suction port 2 is an opening which makes the atmosphere communicate with a pressure reduction chamber 1, is a surface which is located in a boundary between the device of the present invention and the atmosphere, severs as an entrance surface when the gas flows into the pressure reduction chamber 1 and is the endmost surface of a flow path in the device of the present invention. Hereinafter, the area of a plane formed by the suction port 2 serving as the entrance surface of the flow in the device of the present invention is represented by $A_{out}$ [m$^2$]. Although in FIG. 1, one suction port 2 is disposed, the suction port 2 can also be disposed in a plural number, and when the suction ports 2 are disposed in a plural number, the total area is assumed to be $A_{out}$ [m$^2$]. For example, when the suction ports 2 are disposed in a plural number, and are arranged adjacent to each other, the plural suction ports 2 are collectively regarded as one, and the total area is assumed to be $A_{out}$ [m$^2$]. The size of a cross section perpendicularly intersecting the direction of the flow in the flow path starting from the suction port 2 is preferably set such that the flow speed of the suction port 2 becomes the fastest and such that the cross-sectional area of the suction port 2 becomes the smallest. For example, a mechanism like an aperture which can vary the area $A_{out}$ [m$^2$] of the plane formed by the suction port 2 can also be added to the suction port 2.

Although the present invention has a feature of forming a swirl flow around the suction port 2 and the embodiment thereof is mainly described, it is also possible to additionally form a jet and a swirl flow as an internal flow in the pressure reduction chamber 1 by the suction of a gas from the suction port 2. Although the suction port 2 in the present embodiment is disposed in order to form the swirl flow around the suction port 2, and a suction port aimed at forming an internal flow in the pressure reduction chamber 1 is not included unless otherwise particularly specified, Formula (1) and Formula (2) which will be described later are exceptional.

The pressure of the suction port 2 in a state where the suction means 10 is not operated is the atmospheric pressure, and as the pressure of the pressure reduction chamber 1 becomes lower, the pressure of the suction port 2 is also decreased.

The pressure reduction chamber 1 is installed for sucking a gas through the suction port 2 into the suction device 100, and is installed within the suction device 100. The pressure reduction chamber 1 is depressurized by the suction means 10, and thus in the suction port 2, a pressure gradient is produced in the direction of the suction. The size of the pressure reduction chamber 1 is preferably set such that a cross-sectional area perpendicular to the direction of the suction is greater than the area $A_{out}$ [m$^2$] of the plane formed by the suction port 2. It is assumed that the pressure reduction chamber 1 includes the flow path leading to the suction port 2, and when only the flow path is installed within the suction device 100, the flow path is assumed to the pressure reduction chamber 1. The direction of the suction is a tangential direction with respect to a line passing through, without fail, the center of the flow path in the suction means 10, with the suction port 2 being a start point.

An exhaust mechanism 11 is operated as the suction means 10, and thus the gas is sucked from the suction port 2 into the pressure reduction chamber 1 and is exhausted to the outside of the suction device 100. The suction means 10 includes a dust collection mechanism 12 which collects the suction products of a solid and a liquid sucked from the suction port 2 and prevents the suction products from flowing into the exhaust mechanism 11. In the installation of the dust collection mechanism 12, it is necessary to select the dust collection mechanism 12 such that the suction port 2 can reach a critical pressure in consideration of a pressure loss by the dust collection mechanism 12. Although in FIG. 2, the dust collection mechanism 12 is installed within the flow path from the pressure reduction chamber 1 to the exhaust mechanism 11, the dust collection mechanism 12 can be formed integrally with the pressure reduction chamber 1 so as to form the pressure reduction chamber 1 as, for example, a centrifugal force-type dust collector which utilizes a swirl flow formed therewithin, and the position where the dust collection mechanism 12 is installed is not limited.

Examples of targets to be collected by the dust collection mechanism 12 include, for example, dust and foreign substances existing on the surface of the target 31 in a suction region and machining chips generated when cutting, grinding and laser processing are performed on the target 31. The target to be collected is not limited to a solid, and a liquid adhering to the surface of the target 31 can be collected. As another example of the suction of a liquid, the hole portion 32 of the target 31 is formed into a through-hole, a pipe is connected to the through-hole and thus it is possible to suck a liquid which flows through the pipe through the hole portion 32. With respect to a gas, it is possible to suck, from the suction port 2, a gas generated from the target 31.

In a state before the jet means 20 is operated, a state where the pressure of the pressure reduction chamber 1 is lowered by the exhaust mechanism 11, the pressure of the suction port 2 reaches the critical pressure and the flow speed in the suction port 2 reaches a critical state is referred to as a closed state. At this time, since the mass flow rate of the suction port 2 is maximized, the pressure of the suction port 2 does not become lower than the critical pressure even when the pressure of the pressure reduction chamber 1 becomes equal to or less than the critical pressure.

It is known that in a state before the jet means 20 is operated, the maximum mass flow rate $q_m$ [kg/s] in a state where the suction port 2 is closed is given by Formula (1) in the case of an isentropic flow (reference: p. 123, Basis of Fluid Dynamics (2), written together by Koichi Nakamura, Motoyuki Ito and Osami Kito, published by Corona Publishing Co., Ltd. and issued on Sep. 25, 2002). Here, it is assumed that k is the specific heat ratio of the gas, $\rho_0$ [kg/m$^3$] is the density of the gas, a [m/s] is the sound speed of the gas and $A_{out}$ [m$^2$] is the area of the plane formed by the suction port 2. Here, values when as the initial state of the flow, a static and steady state is formed in the atmospheric pressure are used as the specific heat ratio, the density and the sound speed which are the physical property values of the gas used in Formula (1), and the same also applies when they are used in Formulas which will be described later.

$$q_m = \left(\frac{2}{k+1}\right)^{(k+1)/2(k-1)} \rho_0 a A_{out} \qquad \text{Formula (1)}$$

When the exhaust flow rate of the exhaust mechanism 11 is assumed to be $q_{m0}$ [kg/s], the area $A_{out}$ [m$^2$] of the s plane formed by the suction port 2 preferably satisfies the range of Formula (2) in order for the suction port 2 to be brought into the closed state by Formula (1). $A_{out}$ [m$^2$] in Formulas (1)

and (2) is applied to all suction ports which communicate with the pressure reduction chamber 1. When the area of the plane formed by the suction port 2 does not satisfy the following range, it becomes difficult for the pressure of the suction port 2 to reach the critical pressure, and the suction port 2 is not brought into the closed state. As described above, the size of the surface formed by the applicable suction port 2 depends on the exhaust flow rate of the exhaust mechanism 11 to be used.

$$A_{out} \leq \frac{q_{m0}}{\left(\frac{2}{k+1}\right)^{(k+1)/2(k-1)} \rho_0 a} \quad \text{Formula (2)}$$

In the flow path of the gas from the pressure reduction chamber 1 to the exhaust mechanism 11, a cross-sectional area perpendicularly intersecting the direction of the flow in the flow path described above is desirably larger than the area of the plane formed by the suction port 2 on the entire region of the flow path described above. When a position exists which is smaller than the area formed by the suction port 2 in the flow path leading from the pressure reduction chamber 1 to the exhaust mechanism 11, it is likely that the pressure reduction chamber 1 cannot be depressurized to the critical pressure.

In order for the suction port 2 to be brought into the closed state, the attainable pressure of the exhaust mechanism 11 is preferably equal to or less than the critical pressure $p_e$ [Pa] in the suction port 2. In the case of an isentropic flow, the critical pressure $p_e$ of the suction port 2 is represented by Formula (3) through the use of the atmospheric pressure $p_0$ [Pa] and the specific heat ratio k of the gas. In the case of use in the atmosphere, $p_e$=535 [hPa] is established through the use of k=1.4 and $p_0$=1013 [hPa]. The gas to which Formulas (1) to (3) described above are applicable is a gas which fills the inside of the open system where the target 31 is installed, and in the example, the gas is air.

$$p_e = \left(\frac{2}{k+1}\right)^{k/(k-1)} p_0 \quad \text{Formula (3)}$$

Desirably, as performance of the exhaust mechanism 11 to be used, the operation in a state open to the atmosphere can be continuously performed, an attainable pressure is equal to or less than the critical pressure determined by Formula (3), and the exhaust flow rate is equal to or more than the value indicated by Formula (1).

The jet means 20 introduces the gas to the jetting port 3 via a flow rate adjustment mechanism 21 from a gas introduction mechanism 22 which includes a high-pressure gas storage chamber, and jets the gas at a high speed from the jetting port 3. Although even when the number of jetting ports 3 is one, the operation can be performed, the number is preferably equal to or more than two. Although in the example, the number of jetting ports 3 is two, this is an example in which the present invention is implemented by provision of a small number of jetting ports, and it is obvious that the jetting ports having a larger number than that can be disposed.

The jetting port 3 is located in the boundary between the jet means 20 and the atmosphere, serves as an exit when the gas flows out by the jet means 20, and is the endmost plane of the flow path in the jet means 20. Hereinafter, the area of a plane formed by the jetting port 3 that serves as an exit surface of the flow in the jet means 20 is represented by $A_{in}$ [m²]. When a plurality of jetting ports 3 is disposed, the total area is represented by $A_{in}$ [m²], and the same also applies to the following description. The shape of the jetting port 3 is not limited in the present invention, and the same also applies in a case where a plurality of jetting ports 3 is disposed, and a case where their sizes and shapes differ from each other is also included in the scope of the present invention. Furthermore, for example, an area variable mechanism like an aperture which can vary the area of the plane formed by the jetting port 3 can be added to the jetting port 3, and in that case, the area variable mechanism corresponds to the flow rate adjustment mechanism 21.

The areas of the plane formed by the suction port 2 and the jetting port 3 respectively depend on the flow rate of suction in the suction port 2 and the jet flow rate in the jetting port 3. When the ratio of the jet flow rate in the jetting port 3 to the flow rate of suction in the suction port 2 is low, it is difficult to form a swirl flow since a speed component in a swirl direction cannot be sufficiently given to a flow site around the suction port 2.

Also when the area $A_{in}$ [m²] of the plane formed by the jetting port 3 is equal to or more than the area $A_{out}$ [m²] of the plane formed by the suction port 2, it is possible to form a swirl flow, but, in that case, it is not possible to suck, from the suction port 2, all the gas jetted from the jetting port 3, with the result that a part of the gas jetted from the jetting port 3 is leaked outside the device. In a case where the present device is used for laser processing, for example, in a case or the like where a processing target is shielded with the inert gas by jetting an inert gas from the jetting port 3, leakage, outside the device, of a part of the inert gas jetted from the jetting port 3 may not be a problem, whereas in a case where the present device is used for laser decontamination, a by-product containing a radioactive substance which may be harmful to health needs to be prevented from being diffused into the atmosphere. In addition, as described above, in the case where a recovery rate is prioritized, leakage, outside the device, of a part of the gas jetted from the jetting port 3 has to be avoided, and desirably, the area $A_{in}$ [m²] of the plane formed by the jetting port 3 is preferably set smaller than the area $A_{out}$ [m²] of the plane formed by the suction port 2.

The gas introduction mechanism 22 includes the high-pressure gas storage chamber which is the primary pressure side of the jet means 20, and thus can stably supply the gas to the jetting port 3.

The flow rate adjustment mechanism 21 can adjust the flow rate of the gas flowing into the jetting port 3, by control of, for example, the secondary pressure of the jet means 20.

The operating distance adjustment means 30 includes, for example, a stage which can be moved a predetermined distance and a mechanism, such as a laser displacement meter, which measures an operating distance, and is coupled to the suction device 100. The operating distance $W_d$ between the suction port 2 and the target 31 can be controlled to be an arbitrary distance by the operating distance adjustment means 30. When the suction port 2 is disposed in a plural number, only the suction port which forms a swirl flow in the vicinity thereof is set to the target, and no consideration is given to the operating distance $W_d$ on the suction ports other than the suction port described above. When the suction ports 2 are disposed in a plural number, and are arranged adjacent to each other, the plural suction ports 2 are collectively regarded as one, and the average of the operating distances on the suction ports is assumed to be the operating distance $W_d$. The operating distance $W_d$ is assumed to be a distance from the center of the suction port 2 to a surface obtained by performing planar approximation on the surface of the target 31 with respect to a normal direction at the center of the suction port 2 in the plane formed by the suction port 2. Here, a region where planar approximation is performed on the surface of the target 31 use a suction target region as a reference, but does not limit the present invention. Although the surface of the target 31 in FIG. 1 is a flat surface, FIG. 1 shows one embodiment and does not limit the present invention, with the result that there is no limitation on the shape of the surface of the target 31. The feature of the present invention is that the present invention can also be applied to a surface having irregularities, and in the case of a surface having irregularities or a curved surface, the operating distance $W_d$ is determined, with the surface obtained by performing planar approximation on the surface of the target 31 being used as a reference as described above.

As the operating distance $W_d$ is increased, the distance of a swirl flow site to be formed in the direction of a swirl axis is increased, and the ratio of the jet flow rate in the jetting port 3 to the swirl flow is reduced, and thus a speed component in the swirl direction is not sufficiently provided, with the result that it becomes difficult to form a swirl flow.

Therefore, in order for a swirl flow in the present invention to be formed, as in Formula (4), the ratio of the area $A_{in}$ [m²] of the surface formed by the jetting port 3 to the area of a side surface of a pillar in which the plane formed by the suction port 2 is a bottom side and in which the operating distance $W_d$ [m] is a height is preferably set equal to or more than 0.25, and the operating distance $W_d$ [m] is preferably set in the range of Formula (5). In Formulas (4) and (5), the shape of the suction port 2 does not need to be circular, and the shape is not particularly limited. Therefore, the same is true when an equivalent circular diameter which is a diameter where an area is equivalent in a case where the shape is approximated as a circle is used as a guide for the size of the suction port 2, and the equivalent circular diameter of the suction port 2 is assumed to be D [m] and is used in Formulas which will be described later.

$$\frac{A_{in}}{\pi D W_d} \geq 0.25 \qquad \text{Formula (4)}$$

$$W_d \leq \frac{4 A_{in}}{\pi D} \qquad \text{Formula (5)}$$

In a case where the operating distance $W_d$ [m] is greater than the range of Formula (5), it becomes difficult to form a swirl flow, and the operating distance $W_d$ [m] capable of forming a swirl flow in the present invention depends on the area $A_{in}$ [m²] of the surface formed by the jetting port 3 and the equivalent circular diameter D [m] of the suction port 2.

When as shown in FIG. 2, a surface which has a normal vector at the center of the suction port 2 in the plane formed by the suction port 2 and which passes through the center of the jetting port 3 is assumed to be an orthogonal reference plane, a jetting angle $\theta_v$ [rad] of the gas in the jetting port 3 projected on the orthogonal reference plane is preferably set using Formula (6) as a reference, and otherwise is preferably set within the range of Formula (7). Here, it is assumed that the equivalent circular diameter of the suction port 2 is D [m], the operating distance up to the target 31 is $W_d$ [m] and a distance between the centers of the suction port 2 and the jetting port 3 with respect to a tangential direction at the center of the suction port 2 in a line that forms the suction port 2 when being projected on the orthogonal reference plane is $C_d$ [m]. The jetting angle $\theta_v$ indicates an angle formed by the velocity vector of the gas jetted from the jetting port 3 when being projected on the orthogonal reference plane and the surface obtained by performing planar approximation on the surface of the target 31. Here, the region where planar approximation is performed on the surface of the target 31 uses the suction target region as a reference, but does not limit the present invention. In the example of the device described in FIG. 1, a cross section taken along line A-A is the orthogonal reference plane. When a plurality of jetting ports 3 is disposed, in each of the jetting ports 3, the jetting angle is desirably set so as to satisfy the range of Formula (6) or (7), and the orthogonal reference plane in which the center of the jetting port 3 is a passing target point is desirably set for each of the jetting ports 3 to thereby determine the jetting angel. Since the operating distance $W_d$ [m] is a variable with respect to the jetting angle $\theta_v$ [rad] indicated by Formula (6), the addition of a mechanism which can vary the jetting angle $\theta_v$ [rad] in accordance with the change in the operating distance $W_d$ [m] is also included in the scope of the present patent. Furthermore, when a plurality of jetting ports 3 is disposed, the each jetting angle $\theta_v$ [rad] is individually set within the range of Formula (7), with the result that the setting can also be made such that each of the jetting ports 3 has a different jetting angle $\theta_v$ [rad].

$$\theta_v = \tan^{-1}\left(\frac{2W_d}{2C_d - D}\right) \qquad \text{Formula (6)}$$

$$0 < \theta_h < \frac{\pi}{2} \qquad \text{Formula (7)}$$

In the present invention, since the gas jetted from the jetting port 3 has large effect of inertia, unless a positional relationship between the suction port 2 and the jetting port 3 is appropriately arranged, the gas jetted from the jetting port 3 is discharged, as it is, to the outside of the device without the gas jetted from the jetting port 3 passing through the suction port 2, or the gas jetted from the jetting port 3 is linearly sucked toward the center of the suction port 2 without being deflected halfway through, with the result that it does not become possible to form a swirl flow.

Figure 3:
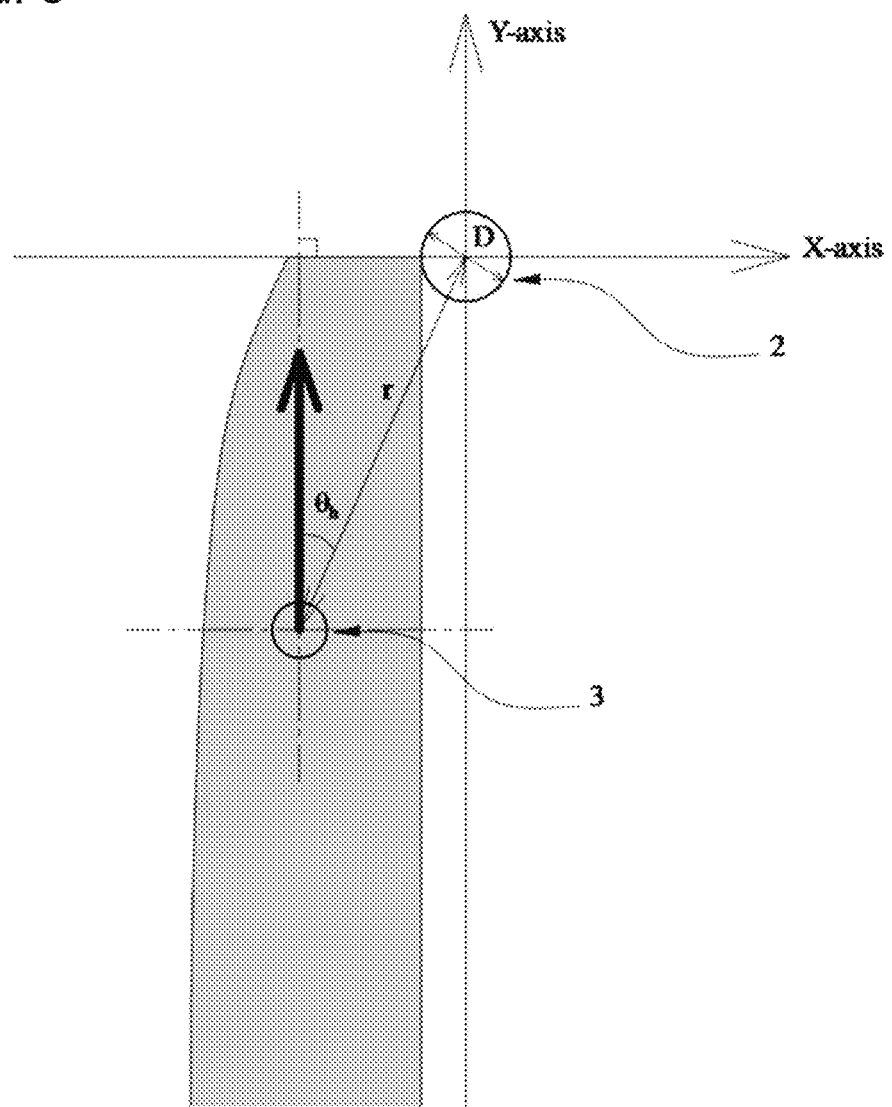
FIG. 3 is an orthogonal coordinate system in which a suction port and a jetting port are projected on a parallel reference plane.

Therefore, the positional relationship between the suction port 2 and the jetting port 3 in the present invention is shown below. When a tangent plane at the center of the suction port 2 in the plane formed by the suction port 2 is a parallel reference plane, an example of the positional relationship when the suction port 2 and the jetting port 3 are projected on the parallel reference plane is shown in FIG. 3. Although in FIG. 3, the shapes of the suction port 2 and the jetting port 3 are circular, FIG. 3 is an example showing the positional relationship between the suction port 2 and the jetting port 3 and does not limit the shapes and the numbers of the suction port 2 and the jetting port 3.

When the suction port 2 and the jetting port 3 are projected, with the parallel reference plane being an orthogonal coordinate system, the coordinate system is determined such that the center of the suction port 2 is the origin of the orthogonal coordinate system and such that the direction of the velocity vector of the gas jetted from the jetting port 3 perpendicularly intersects one of the coordinate axes in the orthogonal coordinate system. In FIG. 3, the coordinate system is set such that the center of the suction port 2 is the origin of the orthogonal coordinate system and such that the direction of the velocity vector of the gas jetted from the jetting port 3 perpendicularly intersects the X-axis of FIG. 3.

When it is assumed that in FIG. 3, the equivalent circular diameter of the suction port 2 is D [m], that the distance between the centers of the suction port 2 and the jetting port 3 is r [m] and that an angle formed by a straight line connecting the center of the jetting port 3 and the center of the suction port 2 and the velocity vector of the gas jetted from the jetting port 3 is $\theta_h$ [rad], the jetting port 3 is desirably arranged with respect to the suction port 2 such that both Formulas (8) and (9):

$$\frac{r\theta_h}{\pi D} < 1 \ \left(0 < \theta_h < \frac{\pi}{2}\right) \quad \text{Formula (8)}$$

$$r\sin\theta_h > \frac{D}{2} \ \left(0 < \theta_h < \frac{\pi}{2}\right) \quad \text{Formula (9)}$$

are satisfied. A gray region shown in FIG. 3 is an example which indicates a region satisfying both Formulas (8) and (9), and the center of the jetting port 3 is desirably arranged within the gray region. When a plurality of jetting ports 3 is disposed, the orthogonal coordinate system is set for each of the jetting ports 3 such that, with the center of the suction port 2 being the origin, the direction of the velocity vector of the gas jetted from the jetting port 3 perpendicularly intersects one of the coordinate axes in the orthogonal coordinate system, and thus it is necessary to satisfy the relationships of Formulas (8) and (9).

Methods of pressure reduction and suction according to the present embodiment are performed as follows by busing the suction device 100 constituted as described above.

The pressure of the pressure reduction chamber 1 is lowered by operation of the exhaust mechanism 11, and thus the gas is sucked from the suction port 2. When the pressure of the suction port 2 reaches the critical pressure $p_e$ [Pa], the suction port 2 is brought into a closed state. Accordingly, the exhaust mechanism 11 is operated at a pressure equal to or less than the critical pressure $p_e$.

The jet speed $v_{out}$ [m/s] of the gas jetted from the jetting port 3 is adjusted using the flow rate adjustment mechanism 21 such that a Mach number M ($v_{out}/a$) which is a ratio of the jet speed to the sound speed a [m/s] when the gas is in a steady and stationary state satisfies Formula (10), and the gas is jetted from the jetting port 3.

$$M > 0.2 \quad \text{Formula (10)}$$

When the Mach number M is equal to or less than 0.2, it is not possible to obtain a sufficient pressure reduction effect without the production of a swirl flow. When the Mach number M is more than 0.2, as will be described later, a swirl flow is produced around the suction port 2, with the result that it is possible to obtain a sufficient pressure reduction effect. As the Mach number M becomes larger, the effect of inertia is enhanced, and thus the proportion of the gas flowing out to the outside in the jet gas jetted from the jetting port 3 is increased. However, even when a part of the jet gas forms a swirl flow around the suction port 2, a pressure reduction effect equal to or less than the critical pressure is maintained. Furthermore, as the Mach number M becomes larger and the flow around the suction port 2 comes closer to the sound speed, a density gradient is generated in the suction port 2 by the effect of compression of the flow, with the result that a pressure reduction effect caused by the lowering of the density is produced.

The operating distance $W_d$ satisfies the conditions of Formula (5) by the operating distance adjustment means 30, and in a state where as described above, the exhaust mechanism 11 is operated to reduce the pressure of the pressure reduction chamber 1, the jet gas flows into the suction port 2 in a state where a projection velocity vector has a given angle with respect to a straight line toward the center of the suction port 2 projected on the parallel reference plane, from the start point of the projection velocity vector obtained by projecting the velocity vector of the jet gas immediately before the jet gas jetted from the jetting port 3 under the conditions of Formula (10) flows into the suction port 2 on the parallel reference plane which is a tangent plane in the center of the plane formed by the suction port 2, with the result that a swirl flow is formed so as to surround the suction port 2. Here, although a centrifugal force is applied by the swirl to the gas around the suction port 2, the swirl flow is maintained since a centripetal force is applied so as to balance with the centrifugal force. When a cylindrical coordinate system in which the swirl axis of the swirl flow is a reference axis is considered, a centripetal force is generated by a pressure gradient with respect to a radial direction, and thus the pressure is reduced toward the direction of the center of the swirl flow, with the result that the pressure of the center portion of the swirl flow is reduced as the swirl speed becomes larger. Since the speed of the gas flowing through the suction port 2 is brought into a critical state by the suction means 10, the swirl speed around the suction port 2 is the sound speed, and thus a pressure reduction effect by the action of the flow along with the formation of the swirl flow is maximized.

Moreover, when the swirl speed of the swirl flow formed around the suction port 2 is increased and the effect of compressibility of the flow becomes significant, a change in density cannot be ignored. Therefore, a density gradient with respect to the radial direction of the cylindrical coordinate system is produced, and thus the density in a center region of the swirl flow is lowered. In this case, since it is necessary to satisfy the gas state equation, a pressure reduction effect is produced by thermodynamic action in which a decrease in density causes a decrease in pressure. This thermodynamic pressure reduction effect is exerted in a direction of accelerating the swirl speed of the swirl flow, and thus the swirl speed of the swirl flow is maintained in a sonic condition.

Since as to the axial direction of the cylindrical coordinate system, the target 31 blocks the flow flowing into the suction port 2, a high-speed swirl flow is formed between the surface of the target 31 and the suction port 2 so as to surround the suction port 2, and thus the pressures of the center portion of the suction port 2 and the region of the center of the swirl flow described above are equal to or less than the critical pressure by the two pressure reduction effects described above, with the result that it is possible to depressurize, in a non-contact manner, a region where the center portion of the swirl flow is in contact with the target 31, to the critical pressure or less and to perform suction.

The surface of the target 31 is depressurized, and thus it is possible to suck and recover, from the suction port 2, an adhered substance and a scattered substance produced on the surface of the target 31. Furthermore, since the interior of the hole portion 32 formed in the target 31 is depressurized in the same way, an adhered substance and a scattered substance existing within the hole portion 32 are also sucked and recovered, and thus it is possible to efficiently remove them. The present invention has the feature of forming a swirl flow between the surface of the target 31 and the suction port 2, and even when an uneven surface shape or a hole is formed therein, a high pressure reduction effect is maintained, and thus it becomes possible to suck an adhered substance and a scattered substance.

The exhaust mechanism 11 is operated to form, around the suction port 2, a suction flow in which the gas in the atmosphere flows toward the center of the suction port 2, the jet gas jetted from the jetting port 3 is linearly moved due to a large inertial force, but when the jet gas reaches the vicinity of the suction port 2, the jet gas receives a force toward the direction of the center of the suction port 2 by a force received from the pressure gradient of the suction flow and by the action of a viscosity generated by a speed gradient, and the jet gas is deflected and is sucked from the suction port 2 in a state of having a certain incident angle with respect to the direction of the center of the suction port 2. The suction flow also receives a force toward the swirl direction by the action of a viscosity by a speed gradient generated by the inflow of the jet gas thereinto, is deflected and is sucked from the suction port 2 in a state of having a certain incident angle with respect to the direction of the center of the suction port 2. The jetting port 3 is disposed so as to satisfy both Formulas (8) and (9), and thus the velocity vector of the jet gas has a speed gradient with respect to the suction flow, with the result that it becomes possible to form a swirl flow. When the speed of the jet gas is increased, the effect of inertia is increased, and even if the jet gas is deflected, the gas does not reach the suction port 2, but the suction flow is deflected by the inflow of the jet gas thereinto as described above, and thus it is possible to form a swirl flow around the suction port 2. In a case where three or more jetting ports 3 are disposed, the jet gasses jetted from the jetting ports 3 overlap each other to thereby interfere with each other, with the result that it becomes possible to form a swirl flow. Note that the case where as described above, three or more jetting ports 3 are disposed and a swirl flow is formed, is also included in the scope of the present invention.

Although in the example described above, the jet means 20 is operated after the operation of the exhaust mechanism. 11, the jet means 20 can also be operated before the operation of the exhaust mechanism 11, and the order of the operations is not limited. Furthermore, the rotation direction of the swirl flow shown in FIG. 1 and the rotation direction of the swirl flow formed in the example of the disposition of the suction port 2 and the jetting port 3 in FIG. 3 do not limit the present invention, and the rotation direction of the swirl flow is not limited.

The equivalent circular diameter is obtained by substitution of the area of a target for determining the equivalent circular diameter, into the formula for the area of a circle. For example, the equivalent circular diameter D [m] of the suction port 2 is obtained from Formula (11) by using the area $A_{out}$ [m$^2$] of the plane formed by the suction port 2.

$$D = 2\sqrt{\frac{A_{out}}{\pi}} \quad \text{Formula (11)}$$

Figure 4:
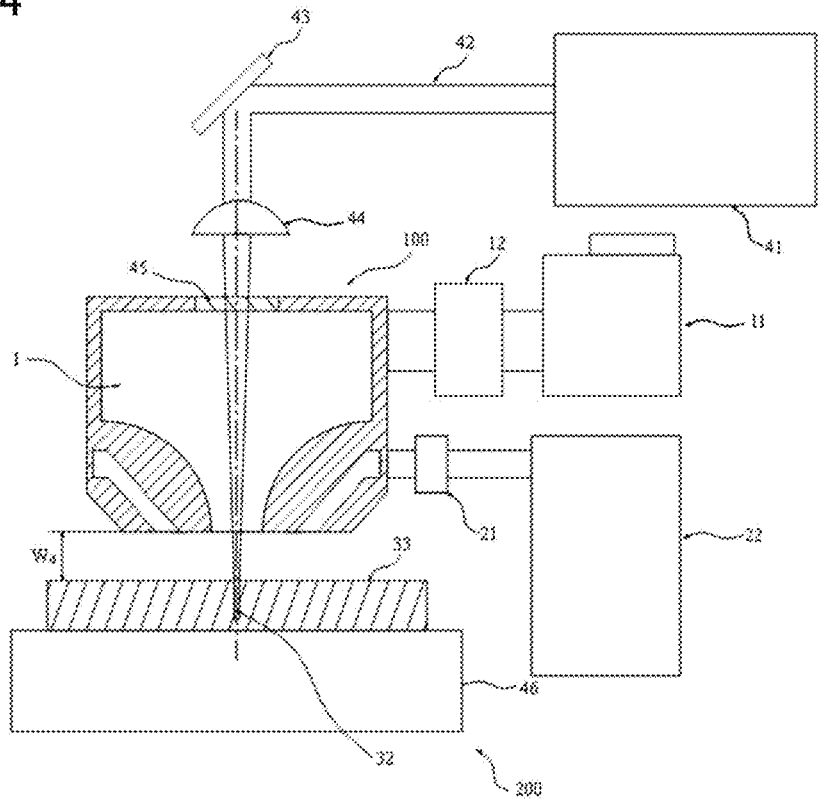
FIG. 4 is schematic configuration diagram on device example of implementing a laser processing device according to the present invention.

FIG. 4 shows an example of the schematic configuration of a laser processing device 200 to which the present invention is applied. The laser processing device 200 used in the present invention includes a laser oscillator 41, an optical system 40 which transmits and focuses laser light 42 emitted from the laser oscillator 41 to thereby irradiate a processing target 33 with the laser light, and the suction device 100 which depressurizes and sucks the vicinity of the focal point of the laser light 42.

In addition to the feature described above, the suction device 100 when being applied to the laser processing device 200 has a transmittance window 45 which transmits the laser light.

Examples of the gas jetted by the jet means 20 in the laser processing device 200 include argon gas, nitrogen gas and the like, in addition to air.

The laser oscillator 41 is formed of a laser oscillator, a wavelength conversion element or the like, and can perform continuous oscillation or pulse oscillation on the laser light 42. In the case of the continuous oscillation, the wavelength and the output which are the properties of the oscillated laser light 42 can be used according to the processing target, whereas in the case of the pulse oscillation, the wavelength, the pulse energy, the pulse width and the repetition frequency which are the properties of the oscillated laser light 42 can be used according to the processing target.

In a case, such as laser cutting, where there is required scanning of the laser light 42 emitted from the laser oscillator 41, the processing target 33 is preferably placed on a processing stage 46.

The optical system 40 includes a mirror 43 which reflects the laser light 42 at an arbitrary angle, a lens 44 which focuses the laser light 42 at an arbitrary distance and the like, and transmits and focuses the laser light 42 emitted from the laser oscillator 41 to thereby irradiate the processing target 33 with the laser light. The laser light 42 entering the lens 44 is preferably collimated into parallel light rays. As other examples of the optical system of FIG. 4, the transmission of the laser light 42 can be simplified using an optical fiber, and a scanner mirror can also be used as the mirror 43. The laser light 42 enters the suction device 100 through the transmittance window 45. The configuration of the optical system 40 described above shows an example, and does not limit the embodiment.

The processing stage 46 has a holding mechanism and a moving mechanism for the processing target 33, and the moving mechanism includes, for example, three orthogonal movement axes and linearly moves the processing target to an arbitrary position on the movement axis at an arbitrary speed. The number of movement axes in the processing stage 46 is not limited. The processing target is moved, by the processing stage 46, to the suction device 100 and can be used as the operating distance adjustment means 30.

As industrial applicability, the present invention has a wide range of applications such as medical devices (dental, surgery) and devices for handling radioactive substances (such as dismantling devices for nuclear submarines and nuclear power plants) in addition to laser processing devices, and is highly advantageous industrially.

Example 1

The results of an experiment on the pressure reduction effect of the suction device 100 as discussed above will be explained.

FIG. 2 is a vertical cross-sectional configuration diagram on the suction device 100 in the example. In the suction device 100 of the example, there were installed the suction port 2 sucking a gas into the pressure reduction chamber 1, the exhaust mechanism 11 exhausting the gas within the pressure reduction chamber 1, the jetting port 3 jetting the gas, the flow rate adjustment mechanism 21 adjusting the flow rate of the gas jetted, the gas introduction mechanism 22 introducing the gas into the jetting port 3 via the flow rate adjustment mechanism 21, and the operating distance adjustment means 30.

The suction device 100 had a structure in which the suction port 2 and the jetting port 3 were integrally formed, and was produced by a multilayer molding method. The shapes of the suction port 2 and the jetting port 3 were circular flat surfaces, and were installed on the same flat surface being the bottom surface of the suction device 100. Therefore, a tangent plane in the center of the suction port 2 was a plane including the bottom surface of the suction device 100.

A flat plate made of acrylic was used as the target 31, and the operating distance $W_d$ was a distance from the bottom surface of the suction device 100 to the surface of the flat plate. The operating distance adjustment means 30 was fixed such that the suction device 100 was able to be moved on an optical rail, and the position of the suction device 100 was adjusted such that the operating distance $W_d$ was a predetermined distance.

Two models shown in Table 1 below were evaluated.

Each of the evaluated models had two jetting ports, and the two jetting ports were arranged symmetrically with the suction port 2 as reference. The diameter of the suction port 2 and the jetting port 3, the distance r between the centers thereof, the jetting angle $\theta_h$ in FIG. 3, and the value indicated by Formula (8) were as shown in Table 1.

TABLE 1

|  | Suction Port 2 Diameter D | Jetting port 3 Diameter d | Distance between centers r | Jetting angle $\theta_h$ | $\frac{r\theta_h}{\pi D}$ |
| --- | --- | --- | --- | --- | --- |
| Model A | 2 mm | 1 mm | 5 mm | 0.64 rad | 0.51 |
| Model B | 4 mm | 2.5 mm | 7.2 mm | 0.59 rad | 0.34 |

A scroll-type vacuum pump capable of performing a continuous atmospheric opening operation was used as the exhaust mechanism 11. The attainable pressure of the vacuum pump was 30 Pa, the exhaust flow rate was 520 L/min, the maximum area of the suction port 2 capable of being used by Formula (2) was 45 mm$^2$ and the equivalent circular diameter at that time was 7.6 mm, with the result that the two models in Table 1 satisfied Formula (2).

A secondary pressure adjustment valve and a flowmeter were used as the flow rate adjustment mechanism 21, and a compressor was used as the gas introduction mechanism 22. The pressure of compressed air introduced from the compressor was adjusted by the secondary pressure adjustment valve, and a measurement was performed using the flowmeter such that a predetermined flow rate was jetted from the jetting port 3. The jet speed in the jetting port 3 was calculated by dividing the area of the jetting port 3 from the measurement value by the measurement value of the flowmeter.

In order to confirm the pressure reduction effect of the suction device 100, a through-hole 32 having a diameter of 1 mm was formed in the surface of the target 31, and a vacuum meter and an oxygen partial pressure meter were made to communicate with the through-hole 32 such that it was possible to measure the pressure of the interior of the hole. The pressure of the interior of the through-hole 32 under conditions in which the operating distance $W_d$ and the jet speed from the jetting port 3 were changed on the two models in Table 1 was measured.

Figure 5:
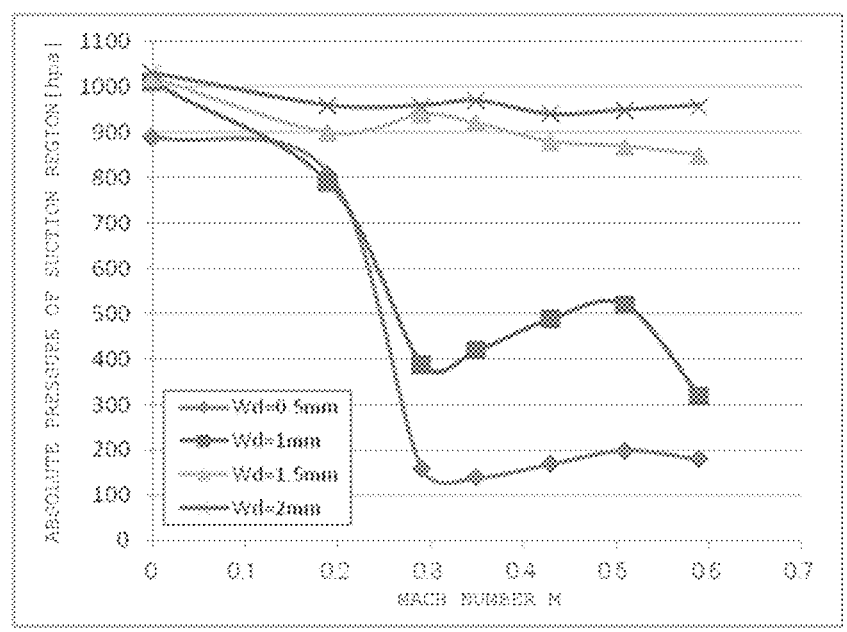
FIG. 5 is a diagram of the results of the measurement of the pressure reduction effect of model A in Example 1.
Figure 6:
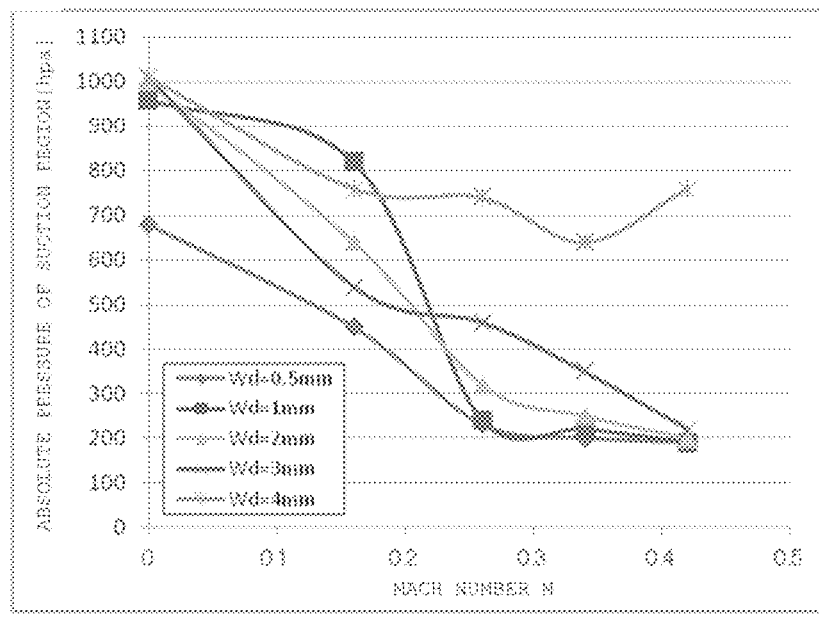
FIG. 6 is a diagram of the results of the measurement of the pressure reduction effect of model B in Example 1.

FIGS. 5 and 6 show the measurement results of the absolute pressure of a suction point by using the vacuum meter under conditions of changing the Mach number M in the jetting port 3 and the operating distance $W_d$. The vertical axis represents the absolute pressure of the suction point, and the horizontal axis represents the Mach number M in the jetting port 3. FIGS. 5 and 6 respectively show the evaluation results of model A and model B, and they were results when the gas was jetted from both the two jetting ports. As is understood from the figures, it was confirmed that in both models A and B, when the operating distance $W_d$ was equal to or less than a predetermined value, the Mach number M in the jetting port fell within a range of 0.2<M<0.5, and the absolute pressure of the suction point was equal to or less than the critical pressure of 535 hPa. It was confirmed that under conditions in which the operating distance $W_d$ was equal to or less than 1 mm in model A and was equal to or less than 3 mm in model B, the absolute pressure was equal to or less than the critical pressure of 535 hPa, and thus it was possible to reduce the absolute pressure to the critical pressure or less in the range indicated by Formula (5).

Figure 7:
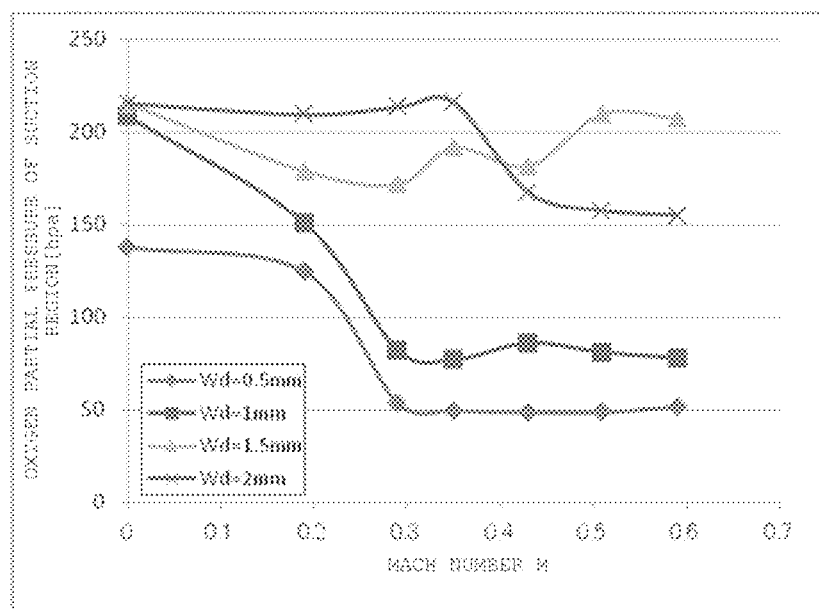
FIG. 7 is a diagram of the results of the measurement of the pressure reduction effect of an oxygen partial pressure of model A in Example 1.
Figure 8:
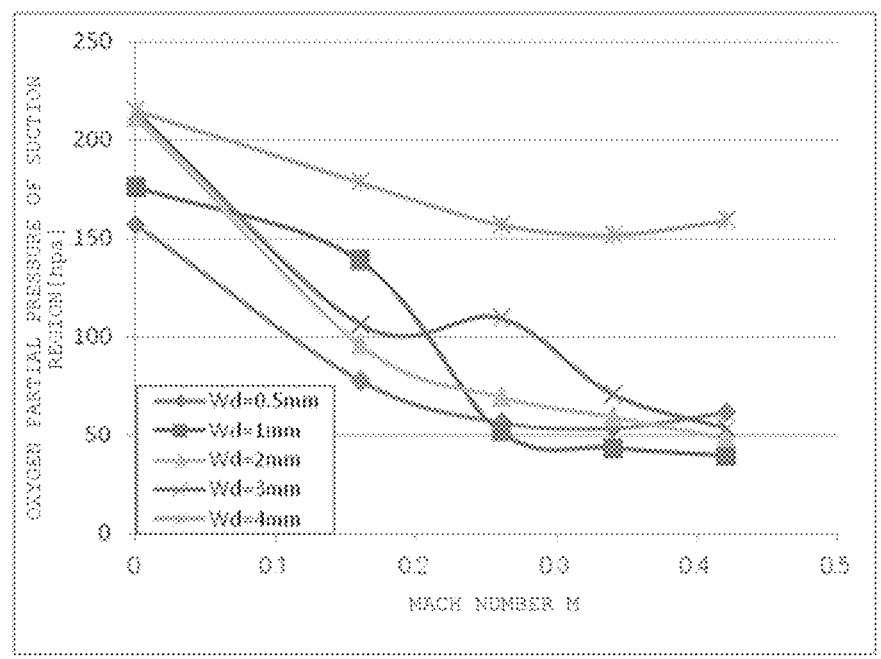
FIG. 8 is a diagram of the results of the measurement of the pressure reduction effect of an oxygen partial pressure of model B in Example 1.

FIGS. 7 and 8 show the measurement results of the oxygen partial pressure of the suction point by using the oxygen partial pressure meter as described above. FIGS. 7 and 8 respectively show the evaluation results of model A and model B, and were results when the gas was jetted from both of the two jetting ports. In the experiment, as described above, compressed air containing oxygen is jetted from the jetting port 3, and it was confirmed that, although an inert gas was not used, the pressure reduction effect of the oxygen partial pressure in the suction point was high by the effect of the present invention. The results show that, when the oxygen partial pressure was converted into an oxygen concentration, the oxygen concentration was equal to or less than 10%. Accordingly, it is found that the effects of combustion suppression and extinguishment in the present invention are high.

It was confirmed from the results of FIGS. 5 to 8 that the pressure reduction effect equal to or less than the critical pressure and the pressure reduction effect of the oxygen partial pressure were indicated by the suction device 100 and that the method and the device of the present invention were effective.

Example 2

Next, the results of the observation of a flow site formed by the suction device 100 of Example 1 will be explained.

The configuration of the suction device 100 was the same as in Example 1, and model B in Table 1 was used. The target 31 was a transparent acrylic flat plate, and tracer particles for visualization were dispersed on the surface.

A camera was installed below the transparent acrylic flat plate such that the suction port 2 disposed in the bottom surface of the suction device 100 was able to be observed through the transparent acrylic flat plate. In order for a surface parallel to the bottom surface of the suction device 100 to be photographed, laser light of visible light was formed into the shape of a sheet parallel to the bottom surface of the suction device 100 and was caused to enter between the bottom surface of the suction device 100 and the transparent acrylic flat plate. In this way, scattered light when the tracer particles were absorbed by the suction device 100 was photographed.

The conditions of the operation of the suction device 100 were set such that the jet speed M in the jetting port holds 3=0.26 and that the operating distance $W_d$ was 2 mm.

Figure 9:
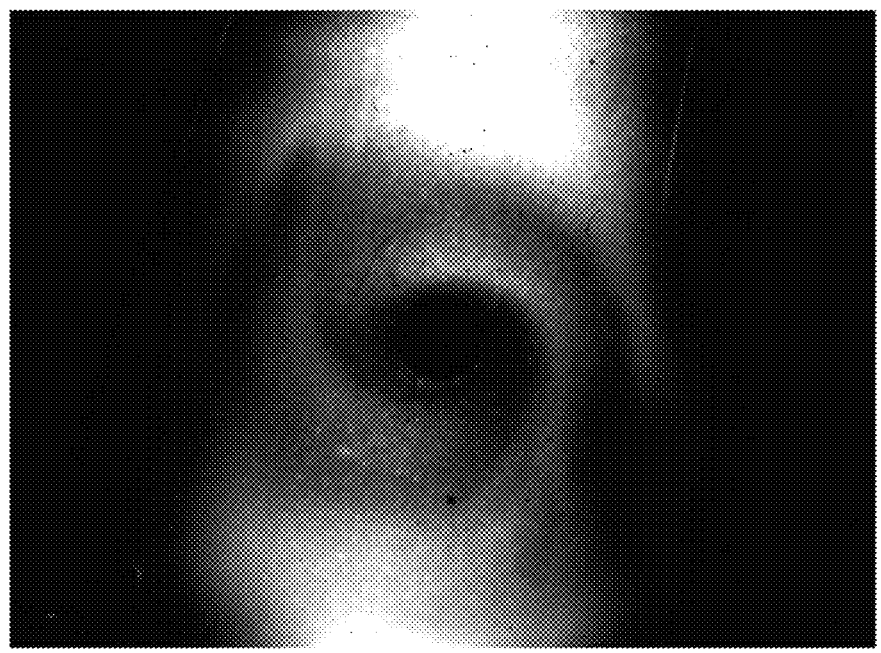
FIG. 9 is a diagram in which a flow site around the suction port in example 3 is visualized.

The results of the photographing under the conditions described above are shown in FIG. 9. FIG. 9 shows the distribution of the scattered light of the tracer particles, and as the brightness is increased, the concentration of the tracer particles is larger. As shown in FIG. 9, the concentration of the tracer particles is decreased in the region is closer to the center of the swirl, and the tracer particles on the target 31 form a vertex flow (swirl flow), with the suction port 2 as the center of the swirl. In the center of the swirl, the scattered light of the tracer particles cannot be observed.

Example 3

Then, the results of an experiment on the evaluation of the recovery rate of a suction product in the suction device 100 of Example 1 will be explained.

The configuration of the suction device 100 was the same as in Example 1, and model B in Table 1 was used.

The target to be sucked in the present example was water, and a concentration trap was used as the dust collection mechanism 12.

As in Example 1, the through-hole 32 having a diameter of 1 mm was formed in the surface of the target 31, and a hollow tube was made to communicate therewith. The tube was coupled to a container that stores the water serving as the target to be sucked. The water surface in the container was open to the atmosphere.

As a method of evaluating the recovery rate of the suction product, the water within the container was sucked and recovered using the suction device 100 as a method of evaluating the recovery rate of the suction product, and the recovery rate was calculated from a change in the weight of the container and the weight of the water recovered using the suction device 100. In the present experiment, before the evaluation experiment of the recovery was performed, the suction device 100 was operated in a state where the container was empty, and it was confirmed that the pressure reduction chamber 1 and the dust collection mechanism 12 did not contain water.

The operation conditions of the suction device 100 were set so as to establish the jet speed M in the jetting port 3=0.26 and to be the operating distance $W_d$ of 1 mm.

The results of the experiment in the present example are shown in Table 2. As shown in Table 2, the weight of the water recovered using the pressure reduction chamber 1 and the dust collection mechanism 12 corresponded to 97% of the change in the weight of the container, and most of the water sucked from the container was able to be recovered.

The results of Table 2 indicated high suction and recovery effects, and it was confirmed that the method and the device in the present invention were effective.

Example 4

Subsequently, the results of laser processing performed by the laser processing device 200 as described above will be explained.

FIG. 4 shows the schematic configuration of a laser processing device in the present example. The laser processing device shown in FIG. 4 includes the laser oscillator 41, the mirror 43, the focusing lens 44, the suction device 100 and a stage 34, emits laser light from the laser oscillator 41, transmits the laser light by using the mirror 43, and passes the laser light through the focusing lens 44 and the suction device 100. The laser light is focused on the surface of a processing target 34 by using the focusing lens 44, and the focal point is depressurized and sucked, by using the suction device 100.

In the present example, a picosecond laser having a pulse width of 600 ps was used as the laser oscillator 41. The wavelength of the laser oscillator 41 used was 532 nm, and the repetition frequency thereof was 40 kHz. Model B shown in Table 1 was used as the suction device 100 of the present example. A plano-convex lens having a focal length of 60 mm was used as a lens 33. A stainless steel plate (SUS304) having a thickness of 0.1 mm was used as the processing target 34. The operation conditions of the suction device 100 were set so as to establish the jet speed M in the jetting port 3=0.26 and to be the operating distance $W_d$ of 1 mm.

Figure 10:
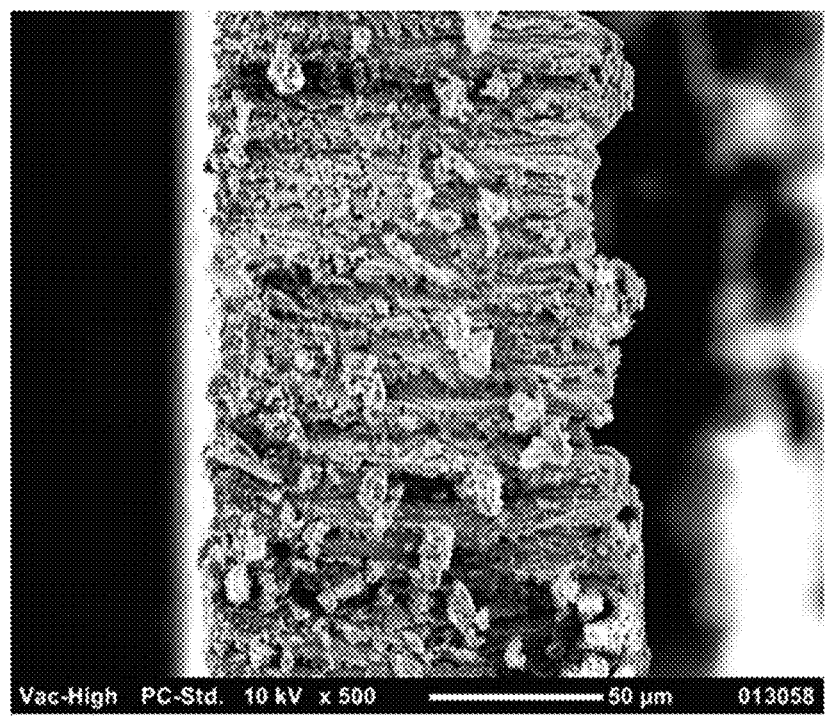
FIG. 10 is an SEM image of a laser cut surface when the present invention is not used in Example 4.
Figure 11:
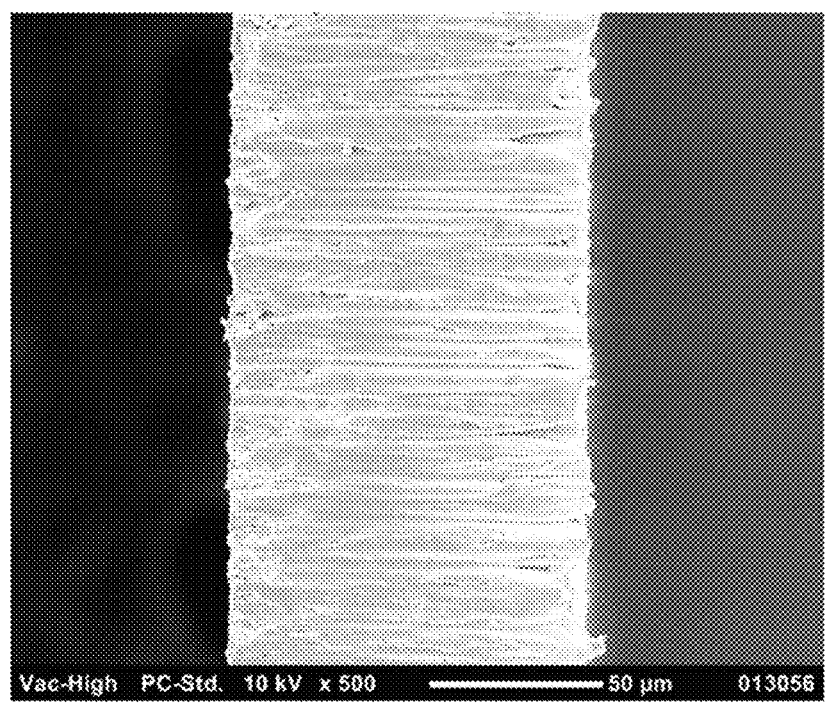
FIG. 11 is an SEM image of a laser cut surface when the present invention is used in Example 4.

The results of processing when reciprocating scanning until the completion of cutting at the output of the laser oscillator 41 of 3 W and at the processing speed of the processing stage 46 of 1 mm/s were shown in FIGS. 10 and 11. FIG. 10 is an SEM image of a laser cut surface when processing was performed without use of the suction device 100, and FIG. 11 shows an SEM image of a laser cut surface when processing was performed while sucking a laser light irradiation region through the use of the suction device 100. In FIG. 10, a by-product remarkably adhered to the laser cut surface, whereas in FIG. 11, the adherence of a by-product was not able to be observed. In the cases of both FIGS. 10 and 11, no post-processing was performed at all on the cut surface.

As is understood from FIG. 11, a cur surface to which almost no by-product adhering was obtained by the present invention, and thus it was confirmed that the method and the device in the present invention were effective. Although in the above discussion, an explanation has been made by taking as an example the cutting of the stainless steel by using the picosecond laser as a target to be laser-processed, the present invention is not limited to the laser processing described above.

REFERENCE SIGNS LIST 1 pressure reduction chamber
2 suction port
3 jetting port
11 exhaust mechanism
12 dust collection mechanism
21 flow rate adjustment mechanism
22 gas introduction mechanism
30 operating distance adjustment means
31 target
32 hole portion
33 processing target
41 laser oscillator
42 laser light

TABLE 2

| | Container weight (including water) | Weight of water within dust collection mechanism 12 | Weight of water within pressure reduction chamber 1 | Recovery rate Total |
|---|---|---|---|---|
| Before suction ① | 171.5 g | 0 g | 0 g | — |
| After suction ② | 117.1 g | 48.7 g | 4.1 g | — |
| Amount of change in weight \|②-①\| | 54.4 g ③ (Suction amount) | 48.7 g ④ (Recovery amount) | 4.1 g ⑤ (Recovery amount) | — |
| Recovery rate | — | 89.5% (④/③) | 7.6% (⑤/③) | 97% |

43 mirror
44 lens
45 transmittance window
46 processing stage
100 suction device
200 laser processing device
D equivalent circular diameter of suction port
d equivalent circular diameter of jetting port
$W_d$ operating distance
$C_d$ distance between centers between suction port and jetting port in FIG. 2
$\theta_v$ angle formed by velocity vector of gas jetted from jetting port and target in FIG. 2
r distance between centers between suction port and jetting port in FIG. 3
$\theta_h$ angle formed by straight line connecting center of jetting port and center of suction port and velocity vector of gas jetted from jetting port in FIG. 3
X-axis X-axis of orthogonal coordinate system in FIG. 3
Y-axis Y-axis of orthogonal coordinate system in FIG. 3

The invention claimed is:

1. A suction method of depressurizing a predetermined range of a surface of a target by depressurizing a pressure reduction chamber communicating with a suction port arranged a predetermined operating distance apart from the target installed in an open system, and sucking a gas from the suction port, wherein:
a pressure of an inside of the pressure reduction chamber is set equal to or less than a critical pressure at which a speed of the gas sucked from the suction port is brought into a critical state;
a jet speed of the gas in a jetting port from which the gas is jetted toward the target is set more than a Mach number of 0.2, the Mach number being obtained by dividing a jet speed of the gas by a sound speed when the gas jetted from the jetting port is in a steady and stationary state;
the gas is jetted from the jetting port and is sucked by the suction port;
a swirl flow is formed so as to surround the suction port between the surface of the target and the suction port; and
thus a pressure of a central region of the swirl flow from the suction port to the surface of the target is reduced to the critical pressure or less and suction is performed,
wherein the jetting port is arranged with respect to the suction port so as to satisfy Formula 1 and Formula 2 below, by using the equivalent circular diameter D which is the diameter where the area is equivalent in a case where the shape of the suction port is approximated as a circle, a distance r between centers of the suction port and the jetting port and an angle $\theta_h$ formed by a straight line connecting the center of the jetting port and the center of the suction port and a velocity vector of the gas jetted from the jetting port, when the suction port and the jetting port are projected on a reference plane that is a tangent plane at a center of the plane formed by the suction port:

$$\frac{r\theta_h}{\pi D} < 1 \ \left(0 < \theta_h < \frac{\pi}{2}\right)$$ (Formula 1)

$$r\sin\theta_h > \frac{D}{2} \ \left(0 < \theta_h < \frac{\pi}{2}\right).$$ (Formula 2)

2. The suction method according to claim 1,
wherein the operating distance $W_d$ is set so as to satisfy Formula 3 below, by using an equivalent circular diameter D that is a diameter providing an equivalent area in a case where a shape of the suction port is approximated as a circle and an area $A_{in}$ of a surface formed by the jetting port $$W_d \leq \frac{4A_{in}}{\pi D}.$$ (Formula 3)

3. A laser processing method of processing a target by irradiation with laser light,
wherein a by-product produced by the irradiation with the laser light is removed or recovered by sucking a laser processing region by using the suction method according to claim 1.

4. A suction device comprising:
gas suction machine which depressurizes a pressure reduction chamber communicating with a suction port arranged a predetermined operating distance apart from a target installed in an open system to thereby suck a gas through the suction port to an interior of the pressure reduction chamber; and
gas jetter which includes flow rate adjustor that adjusts a flow rate of the gas and which jets the gas from a jetting port toward the target at a high speed,
wherein:
a pressure of the inside of the pressure reduction chamber is set equal to or less than a critical pressure at which a speed of the gas sucked from the suction port by using the gas suction machine is brought into a critical state;
a speed of the gas jetted from the jetting port by using the gas jetter is set more than a Mach number of 0.2, the Mach number being obtained by dividing the speed of the gas by a sound speed when the gas is in a steady and stationary state;
a swirl flow is formed so as to surround the suction port between the surface of the target and the suction port; and
thus a pressure of a central region of the swirl flow from the suction port to the surface of the target is reduced to the critical pressure or less and suction is performed;
wherein in the gas jetter, the jetting port is arranged with respect to the suction port so as to satisfy Formula 1 and Formula 2 below, by using the equivalent circular diameter D that is the diameter providing an equivalent area in a case where the shape of the suction port is approximated as a circle, a distance r between centers of the suction port and the jetting port, and an angle $\theta_h$ formed by a straight line connecting the center of the jetting port and the center of the suction port and a velocity vector of the gas jetted from the jetting port, when the suction port and the jetting port are projected on a reference plane that is a tangent plane at a center of the plane formed by the suction port $$\frac{r\theta_h}{\pi D} < 1 \ \left(0 < \theta_h < \frac{\pi}{2}\right)$$ (Formula 1)

$$r\sin\theta_h > \frac{D}{2} \ \left(0 < \theta_h < \frac{\pi}{2}\right).$$ (Formula 2)

5. The suction device according to claim 4, comprising:
an operating distance adjustor configured to adjust the operating distance.

6. The suction device according to claim 5,
wherein the operating distance $W_d$ is set so as to satisfy Formula 3 below, by using an equivalent circular diameter D that is a diameter providing an equivalent area in a case where a shape of the suction port is approximated as a circle and an area $A_{in}$ of a surface formed by the jetting port $$W_d \leq \frac{4A_{in}}{\pi D}. \qquad \text{(Formula 3)}$$

7. The suction device according to claim 4,
wherein the gas suction machine includes: an attainable pressure that is equal to or less than the critical pressure at which the speed of the gas sucked from the suction port is brought into the critical state; and an exhaust mechanism in which an exhaust flow rate $q_{m0}$ satisfies Formula 4 below, by using a specific heat ratio k, a density $\rho_0$, a sound speed a and an area $A_{out}$ of a plane formed by the suction port which are physical property values of the gas in the steady and stationary state $$q_{m0} \geq \left(\frac{2}{k+1}\right)^{(k+1)/2(k-1)} \rho_0 a A_{out}. \qquad \text{(Formula 4)}$$

8. A laser processing device that processes a target by irradiation with laser light, the laser processing device comprising:
the suction device according to claim 4,
wherein a by-product produced by the irradiation with the laser light is removed or recovered by sucking a laser processing region by using the gas suction machine.

* * * * *